No. 685,948. Patented Nov. 5, 1901.
E. SCHUMACHER.
MACHINE FOR HEADING PINS WITH GLASS.
(Application filed Aug. 2, 1901.)
(No Model.)
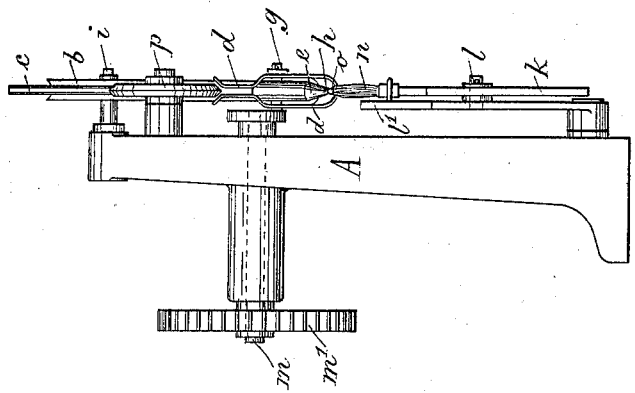
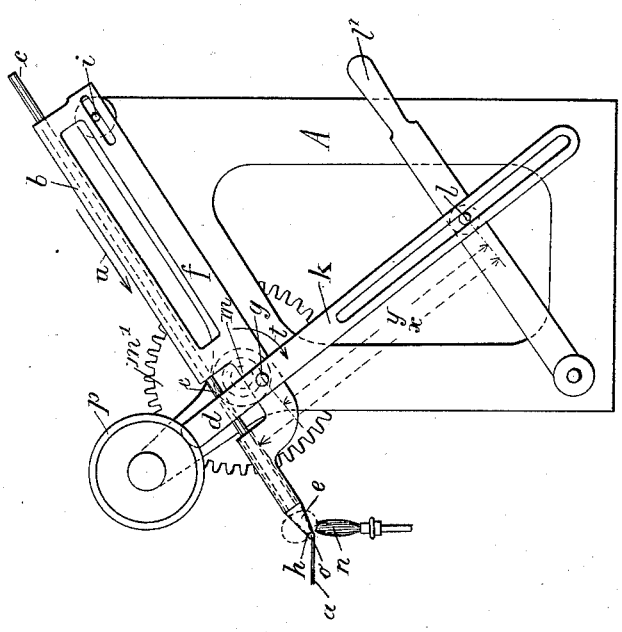
Witnesses:
Arthur Tumpe
Edward Ray
Inventor:
Erich Schumacher
by his attorneys
Roeder & Friese

UNITED STATES PATENT OFFICE.

ERICH SCHUMACHER, OF AIX-LA-CHAPELLE, GERMANY.

MACHINE FOR HEADING PINS WITH GLASS.

SPECIFICATION forming part of Letters Patent No. 685,948, dated November 5, 1901.

Application filed August 2, 1901. Serial No. 70,621. (No model.)

*To all whom it may concern:*

Be it known that I, ERICH SCHUMACHER, a citizen of Germany, and a resident of Aix-la-Chapelle, Germany, have invented certain new and useful Improvements in Machines for Heading Pins with Glass, of which the following is a specification.

This invention relates to a machine for providing the end of a pin-shank with a glass bead, which constitutes the head. By my invention a glass rod is fed toward the pin-shank and its end is molten into a bead and automatically converted into a head, which is secured to such shank.

In the accompanying drawings, Figure 1 is a side elevation of my improved machine, and Fig. 2 a front elevation thereof.

The letter $a$ represents the pin-wire or shank to be headed, which is rotated and fed forward, either gradually or intermittently, by mechanism not illustrated in the drawings and forming no part of the present invention.

To the machine-frame A is fulcrumed at $i$ a slide $f$, provided with a trough or groove $b$ and with a conical nozzle $e$. Reciprocating and oscillating motion is imparted to the slide $f$ by means of a crank $g$ of work-shaft $m$, driven from gear $m'$, so that the end $h$ of the nozzle $e$ will describe a figure, as indicated by dotted lines. The glass rod $c$, placed in the groove $b$, is grasped by a pair of spring-jaws $d$, arranged opposite a notch formed in the slide $f$ between the groove $b$ and the nozzle $e$. The jaws $d$ are secured to the upper end of a lever $k$, which is also driven from the crank $g$, so as to receive reciprocating and oscillating movement. The lever $k$ is slotted to embrace a fulcrum $l$, formed on a hand-lever $l'$. By setting this hand-lever up or down, and thus shifting the fulcrum $l$, the play of lever $k$ may be adjusted to a different feed-stroke. The motion of lever $k$ is at the crank-pin $g$ equal to that of slide $f$, while at the working faces of the jaws $d$ it is greater than such slide in the same proportion as the length of line $x$ is to that of line $y$, Fig. 1. Before the work-shaft $m$ is rotated the nozzle $e$ is heated by electricity, a flame, or other source of heat $n$, so that the end of the glass rod, which is contained in the nozzle, is molten. While the crank-pin $g$ moves in the direction of the curved arrow $t$ the glass rod $c$, held by the jaws $d$, receives a greater motion in the direction of the straight arrow $u$ than does the slide $f$. By this difference in motion the glass rod is thus fed forward and through the nozzle, so that a corresponding quantity of the molten glass is squeezed through the nozzle. This liberated portion or drop $o$ of molten glass is by the elliptical or circular movement of the nozzle formed into a bead, which attaches itself to the end of the rotating pin-wire $a$, and thus forms the head. While moving forward the jaws $d$ close upon the glass rod by their own elasticity; but on moving backward they are spread by a roller $p$ or similar device, so as to liberate the rod. Upon the next forward movement the jaws clear the roller $p$ to again grasp and feed the rod $c$ in the manner previously described.

It will be seen that by adjusting the relative movement of the slide $f$ and lever $k$ the size of the glass drop produced may be regulated, so that larger or smaller heads may be formed.

The conical nozzle is designed to form regular and equal heads, while if less regular heads are desired an open form of nozzle or delivery end may be employed.

What I claim is—

1. In a machine for heading pins with glass, the combination of a nozzle for delivering the glass with means for heating said nozzle, substantially as specified.

2. In a machine for heading pins with glass, the combination of a nozzle with means for feeding a glass rod through said nozzle, and means for heating said nozzle, substantially as specified.

3. In a machine for heading pins with glass, the combination of a nozzle with means for imparting an oscillating movement to said nozzle, means for feeding a glass rod through said nozzle, and means for heating the nozzle, substantially as specified.

4. In a machine for heading pins with glass, the combination of an oscillating nozzle with oscillating jaws for feeding a glass rod through said nozzle, and means for heating said nozzle, substantially as specified.

5. In a machine for heading pins with glass, the combination of a nozzle for delivering the glass, with means for heating the nozzle, jaws for feeding the glass through the nozzle, and means for adjusting the feed-stroke of said jaws, substantially as specified.

Signed by me at Aix-la-Chapelle, Germany, this 23d day of July, 1901.

ERICH SCHUMACHER.

Witnesses:
  H. ANOWLFLIEG,
  CARL BOLLMANN.